Jan. 6, 1931.  M. COPPOLA  1,788,276
LIFE PRESERVER-BUMPER-EMERGENCY BRAKE-POLICE AUXILIARY DEVICE
Filed July 30, 1929  2 Sheets-Sheet 1
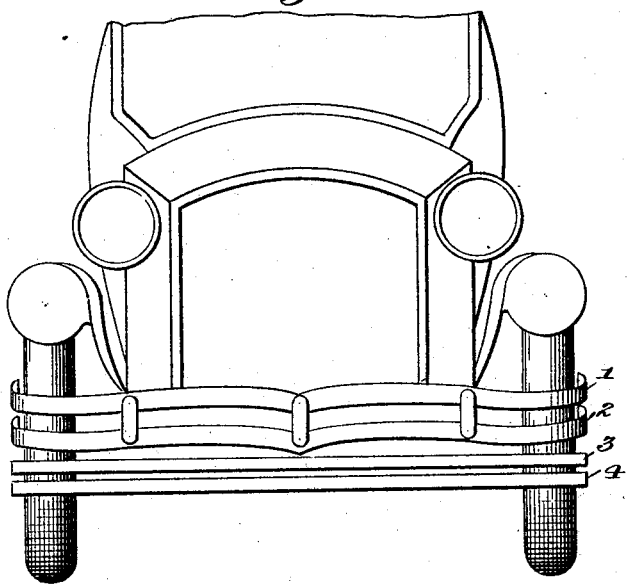
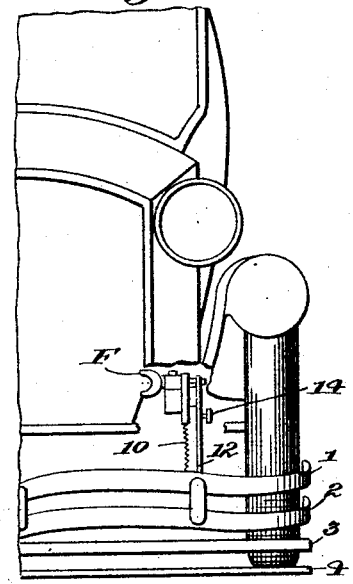
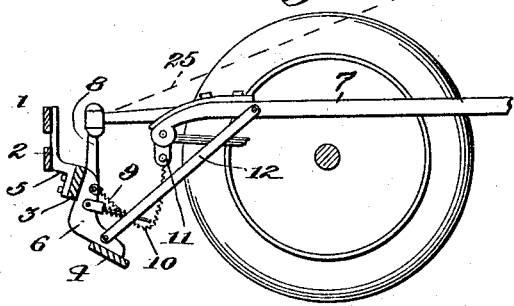
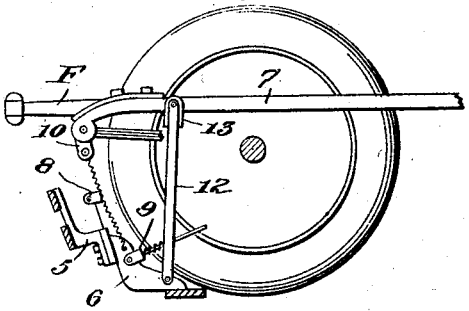
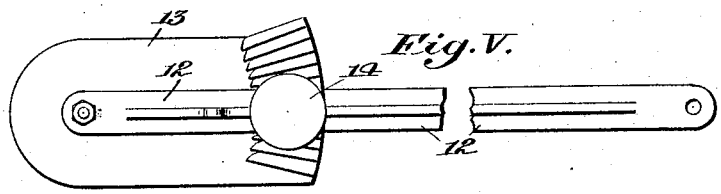
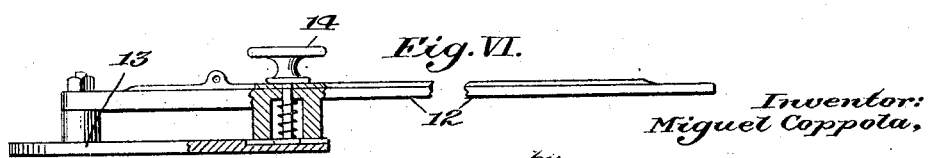
Inventor:
Miguel Coppola, Jan. 6, 1931. M. COPPOLA 1,788,276
LIFE PRESERVER-BUMPER-EMERGENCY BRAKE-POLICE AUXILIARY DEVICE
Filed July 30, 1929 2 Sheets-Sheet 2
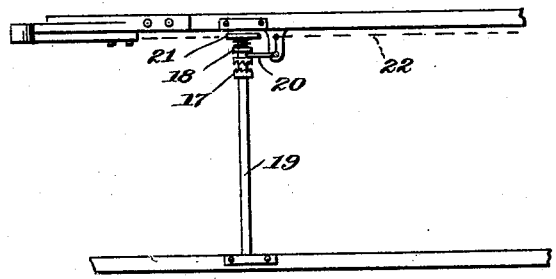
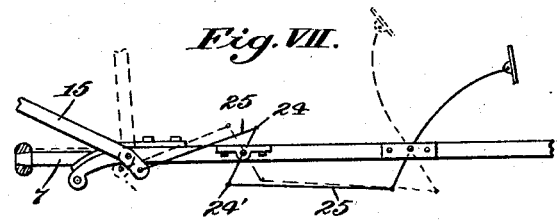
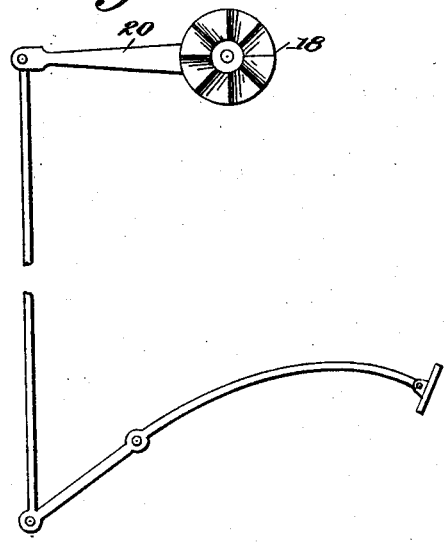
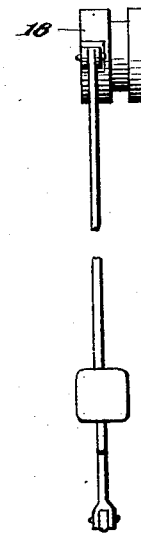
Inventor:
Miguel Coppola,
by
Langner, Parry, Card & Langner
Attys.

Patented Jan. 6, 1931

1,788,276

UNITED STATES PATENT OFFICE

MIGUEL COPPOLA, OF MONTEVIDEO, URUGUAY

LIFE-PRESERVER BUMPER-EMERGENCY-BRAKE POLICE AUXILIARY DEVICE

Application filed July 30, 1929. Serial No. 382,175.

This invention relates to an auxiliary device for automobiles and similar vehicles, and is particularly adapted to the preservation of life, for service as a bumper, and for action as an emergency brake. The device is preferably placed on the front part of the vehicles, and as stated before is particularly adapted for motor driven vehicles, inasmuch as the latter are involved in the majority of vehicular accidents.

Prior to the conception of my invention, considerable attention had been directed to the various circumstances present both before and after accidents. As a result of such observations it has been decided that the object of this invention is the provision of a vehicle with a powerful automatic brake which latter, together with the usual brakes of the vehicle, will cause the almost instantaneous stopping of the latter, either to avoid running over the victim after he is knocked down, or to stop the vehicle once the accident has occurred. By this latter function the invention prevents the occurrence of further damage which frequently results from the sharp and violent turns of the vehicle caused by the incompetence of the driver or his loss of control of the vehicle. The said function further aids the authorities by preventing the escape of the driver with the vehicle.

Particular attention has been directed to the provision of a device which will not deform the lines of the vehicle, and to that end, the device has been given the shape of the ordinary bumper.

By way of illustration, one exemplification of my device is shown in the accompanying drawing wherein:

Fig. I is a front view of an automobile with the device in its normal position;

Fig. II is a fragmentary front view showing the device in its lowered position and adapted for use as a life preserver and brake;

Fig. III is a side view of the protection device in its normal position, similar to Fig. I;

Fig. IV corresponds to Fig. III, but represents the protection device in its lowered or operative position;

Fig. V is a fragmentary detail on an enlarged scale of a part of the device shown in Fig. IV, and is in plan elevation;

Fig. VI is a side elevation of the device of Fig. V;

Fig. VII is a schematic representation of the arrangement whereby the device is placed in its operable position for action as a life preserver and brake;

Fig. VIII illustrates schematically the arrangement by which the device is caused to act only as a bumper;

Fig. IX is another detail of the arrangement of Fig. VII; while

Fig. X is still another detail of the device of Fig. VII, and is shown in 90° relation with Fig. IX.

It is to be understood that in the following explanation only one of each of the several parts of the device is illustrated. The bars, squares, or plates (hereinafter called "plates") of the several figures are illustrated at 1, 2, 3, and 4 and are arranged to have the form of the ordinary bumper. Plates 1 and 2 may be on the same plane, with plate 3 arranged on a different and lower plane, while plate 4 may be on a still lower plane. The plates 1 and 2 are preferably secured rigidly to brackets 5, while plates 3 and 4 may be connected to shoe pieces 6; the plates 1-4, brackets 5, and shoe pieces 6 forming a rigid body. The body thus formed has two projecting arms 8 securely fastened to its rear surface having substantially the shape of a half-cone and are adapted to engage corresponding half-cone shaped notches in the free ends of supports 7 mounted on the chassis of the vehicle. The engagement between the co-operating elements 7 and 8 is preferably such as to permit a certain freedom of movement to absorb the shocks which the vehicle may receive while running. Springs 9 are provided for retaining the device in its raised position.

When a person is struck by a vehicle provided with my device, pressure is thereby exerted against plates 1 and 2. The pressure so produced forces the device rearwardly against the resistance of the springs 9 which will hold the device in its raised position, thereby causing the arms 8 to disengage the supports 7, whereby the device is lowered forwardly of the front wheels in the manner indicated in Figs. II and IV.

Metal cables 10 are provided, the ends of which are respectively fastened to a corresponding shoe 6 and to a projection 11 which is securely attached to the chassis. The cables prevent the wheels from running over the device when in the position shown in Fig. IV. Experience has shown that when the device falls to the position of Fig. IV, the wheels of the vehicle tend to run over the device, whereby, since such tendency is resisted by the cables 10, the shoes 6 are pressed so forcefully against the pavement that the vehicle will be brought to an almost instantaneous stop. Because of the arrangement shown, the tires are not subjected to violent wear because the contact is borne by the shoes 6 alone, the wheels being mounted on the shoes, as has been pointed out before.

A set of guides 12 are provided having their ends freely mounted, respectively, on the device adjacent the shoes 6 and on racks 13 which in turn are preferably securely mounted on the chassis shown in Fig. IV. The upper ends of the guides 12 carry a spring-biased ratchet engaging rack 13 (Figs. V and VI), for cooperation with the cables 10 to prevent the wheels running over the device. The desired result is obtained since both cables and the racks and ratchets limit the distance through which the device may be swung rearward.

Combined with the guides 12 there is a switch of any convenient design for cutting off the electric current to the vehicle motor, so that the latter will stop immediately when the device has fallen. The switch and its connection are not shown in the drawings.

Fig. VII schematically illustrates the arrangement whereby the device will act as a bumper when the motor is connected to the transmission. In the said view, a link 15 is provided, one end of which is freely mounted on a support 7, similar to that shown in Figs. III and IV, and is connected to the clutch of the motor by means of rods and joints 23, 24, 24', and 25. The dotted lines show the position of the link 15 when the clutch is released. When the motor is connected to the transmission the link 15 is in a substantially horizontal position and its free end is positioned in the rear of the cone-shaped arm 8, thereby preventing backward movement of the device and thus disengaging the support 7 regardless of the pressure exerted thereon.

It is a well known fact that almost invariably the first act of a driver confused by possible danger is to release the clutch, and it is from that moment onwards that the device is in a position to function as a life preserver, since by such involuntary action the link 15 becomes disengaged from the arm 8. It is in order that the device may normally serve the function of the ordinary bumper and at the same time be capable of being capable rapidly brought into position as a life preserver and brake, that I have combined the link 15 with the clutch. It is obvious however, that it is readily feasibly that the link may be connected with a hand brake of the vehicle, especially in those vehicles which do not have a lever actuated gear shift.

The arrangement illustrated in Fig. VIII is provided so that the device may be employed only as a bumper, and is especially valuable when touring outside the city limits, and where the use of the device as a life preserver is not essential. This arrangement comprises a shaft 19, the ends of which are mounted on the longitudinal beams of the chassis. A suitable clutch formed by parts 17 and 18 is preferably mounted on the said shaft, and inspection of the foregoing will show that the part 18 is freely mounted thereon and carries a projection or arm 20 which in turn has its free end connected to a rod. The said rod connects to the joint 24' of Fig. VII. A spring 21 tends to normally maintain the part 18 in engagement with the part 17. A cable 22 secured to the arm 20 is adapted to disengage the parts 17 and 18, the said cable being operable from the driver's seat.

In order to advise a negligent driver when he is carrying the device as a bumper only, suitable means are provided such as a cable running from the driver's seat to the front of the vehicle. This cable works a suitable arrangement which is combined with the light system of the vehicle to show at night whether the device is arranged to work only as a bumper or as a life preserver. During the day time the light is substituted by a small flag or any other suitable signal. Such arrangement is not shown in the drawing, but it is within the contemplation of the invention that such signal be visible both to the operator of the vehicle and to the pedestrian.

The further provision is made of a metal cable 25 running from the driver's seat to enable the driver to operate the device.

It is readily understood that the invention is susceptible to numerous adaptations and modifications, and it is intended that the scope thereof be limited only by the appended claims.

I claim:

1. A protection device for vehicles comprising a plurality of transverse plates mounted in substantially the same plane, at least one plate arranged in a lower plane, and at least one additional plate arranged in a third lower plane, supports on which the said plates are rigidly mounted to form a solid body, arms projecting from the rear surface of the said body and having substantially half-cone shaped free ends, supports mounted on the chassis of the vehicle and having substantially half-coned notches thereon corresponding to and adapted to engage with the free ends of the said projecting arms, springs for maintaining the device in its raised position, cables adapted for cooperation with the first-mentioned supports to prevent the device from being overrun by the front wheels of the vehicle when the device is lowered, the said first-mentioned supports being adapted to act as brake shoes when the device is in its lowered position, guides secured to the device and chassis for controlling the movement of the device, and a rack and ratchet cooperable with the said guide to stop the vehicle motor when the device is lowered.

2. In a protection device according to claim 1, means connected with the motor clutch for lowering the device when the clutch is disengaged, and for raising the device to serve as a bumper when the clutch is engaged.

3. In a protection device according to claim 1, means whereby the driver may operate the device for use only as a bumper.

4. In a protection device according to claim 1, means connected with clutch of the vehicle whereby upon release of the clutch the device will be lowered, and upon emergency the clutch of the device will be raised to serve as a bumper, and means for disengaging at the will of the operator the said last-mentioned means whereby the device may be employed only as a bumper.

5. In a protection device according to claim 1, means for determining at a glance whether the device is adapted for work as a life preserver and emergency brake or only as a bumper.

6. In a protection device according to claim 1, means connected to the motor clutch whereby upon release of the clutch the device will be lowered and upon engagement of the clutch the device will be raised, means for disengaging the said last mentioned means and for retaining the device in a position to act only as a bumper, and means for indicating at a glance which of the last two mentioned means are in operation.

7. A protection device for vehicles comprising a plurality of transverse plates mounted in substantially the same plane, at least one plate arranged in a lower plane, and at least one additional plate arranged in a third lower plane, supports on which the said plates are rigidly mounted to form a solid body, arms projecting from the rear surface of the said body and having substantially half-cone shaped free ends, supports mounted on the chassis of the vehicle and having substantially half-coned notches thereon corresponding to and adapted to engage with the free ends of the said projecting arms, springs for maintaining the device in its raised position, cables adapted for cooperation with the first-mentioned supports to prevent the device from being overrun by the front wheels of the vehicles when the device is lowered, the said first-mentioned supports being adapted to act as brake shoes when the device is in its lowered position, guides secured to the device and chassis for controlling the movement of the device, and a rack and ratchet cooperable with the said guide to stop the vehicle motor when the device is lowered, the said device being operable in any combination with the wheels of the vehicle.

In testimony whereof I have signed my name to this specification.

MIGUEL COPPOLA.